United States Patent [19]

Smith

[11] 3,955,319
[45] May 11, 1976

[54] HORTICULTURAL SHEET MULCH

[76] Inventor: Norman J. Smith, 1655 Junior Drive, Vineland, N.J. 08360

[22] Filed: Apr. 14, 1975

[21] Appl. No.: 567,933

Related U.S. Application Data

[63] Continuation of Ser. No. 460,746, April 15, 1974, abandoned, which is a continuation-in-part of Ser. No. 293,661, Sept. 29, 1972, abandoned.

[52] U.S. Cl. .......................................... 47/9; 47/56
[51] Int. Cl.² ...................... A01G 1/00; A01C 1/04
[58] Field of Search .......................... 47/9, 1, 56, 58

[56] References Cited
UNITED STATES PATENTS

| | | | |
|---|---|---|---|
| 1,377,566 | 5/1921 | Eckart | 47/9 |
| 1,396,269 | 11/1925 | Eckart | 47/9 |
| 1,553,035 | 9/1925 | Eckart | 47/9 |
| 2,740,233 | 4/1956 | Reynolds | 47/9 |
| 3,160,986 | 12/1964 | Watson et al. | 47/56 |
| 3,384,993 | 5/1968 | Kane | 47/58 |
| 3,580,196 | 5/1971 | Lofgreen | 47/9 X |
| 3,805,446 | 4/1974 | Aoyagi | 47/9 |

*Primary Examiner*—Robert E. Bagwill
*Attorney, Agent, or Firm*—Eisenman, Allsopp & Strack

[57] ABSTRACT

There is disclosed an agricultural mulch in sheet form pierced by a recurring, closely spaced slit pattern which provides normally closed passage points between the open air and ground at any random point in the growing area for germinating plants and rain water. The slit pattern can provide structural integrity for the sheet laterally, longitudinally, diagonally or various combinations thereof, and can additionally provide flaps which can be oriented to protect the emergent plants from cold winds.

18 Claims, 13 Drawing Figures

HORTICULTURAL SHEET MULCH

This is a continuation of copending application Ser. No. 460,746, filed Apr. 15, 1974 and now abandoned which application is a continuation-in-part of application Ser. No. 293,661, filed Sept. 29, 1972, also abandoned.

BACKGROUND OF THE INVENTION

This invention relates to the art of horticulture and, more particularly, to products for controlling temperature, vapors and gases, weeds, light, nutrients and insects in the growing area.

Present-day horticulture techniques involve numerous complex and costly operations for augmenting such growth parameters as soil moisture and temperature, and for selectively controlling weeds, pest insects, plant virus, and fungus. For example, special surface layers, often formed of plastic and called mulches, are used to conserve moisture and to reduce erosion and leaching away of fertilizer. If they are light-impermeable, they also discourage weed growth; and if light-reflecting, they can augment foliage growth and control aphids and plant virus. If light-permeable, they can bring about rapid heating of the soil for early seed germination. Weed growth, in the case of transparent mulches, and ground insects, in the case of both transparent and opaque mulches, are typically controlled by herbicides and pesticides applied to the ground prior to mulching.

If all of the controls are properly coordinated and regulated, benefits in the form of improved yield and quality of the crop can be pronounced, although with attendant expense and in some cases risk. For example, the difficulty and hence cost of arranging sheet mulch over seed rows (either before or after planting) so that the sheet does not impede early growth and so that rain or sprinkler water can find its way to the plant roots, have limited the usefulness of this otherwise effective mulching technique. Also, the recovery of the sheet plastic after the crop harvest has been difficult. Corn stalks, for example, growing through tough plastic sheeting, render the sheet difficult to take up without wrapping up the stalks in a bulky, useless mass in which neither the plastic nor the stalks can be used. Also, ecological factors complicate the use of pesticides and herbicides. Migrating sprays, for example, can reach unintended areas, and lack of precision in metering can adversely affect the crop, in addition to creating possible long- and short-term contamination problems.

Planting beneath sheet mulches, whether clear or opaque, introduces the problem of the plants gaining access to the atmosphere through apertures in the sheet. At one extreme, with limited apertures, plant growth and watering are inhibited and excessive heat is generated; at the other, with many holes punched out of the sheet, the effectiveness of the mulch is lost by excessive soil exposure. If the seeds are planted before the sheet is put down, registration of the emergent plants and the apertures is difficult. Planting seeds through the sheets to overcome the registration problem is difficult and, in any event, it cannot readily be accomplished by conventional seeders.

SUMMARY OF THE INVENTION

Accordingly, it is an object of the invention to provide a sheet mulch which lends itself to seeding or planting plants, either before or after the sheet is placed on the ground.

Another object of the invention is to provide a sheet mulch for crops which affords easy egress for the newly germinated plants but which nevertheless protects against excessive moisture evaporation from the soil, while at the same time allowing rain water or sprinkler irrigation water to reach the critical plant areas.

It is another object of the invention to provide any or all of the following: weed control, plant growth stimulation, early germination, wind protection, crust reduction, erosion and leaching control, and steep slope planting.

Another object of the invention is to provide a combination clear or light-transmitting mulch and soil chemical carrier in which the complementary and desirable features of both mulching and chemical control are attained in a coordinated, efficient and economical manner.

Another object of the invention is to provide a sheet mulch for grass and grain crops which can be applied after seeding and before germination.

Still another object of the invention is to provide a sheet mulch with upwardly yielding portions which can be oriented to protect emergent plants from cold prevailing winds and sky radiation.

In accordance with one embodiment of the invention, a sheet material in the form of thin sheeting of a material such as plastic or aluminum, has formed therein, in a central band to overlie the growing row, a pattern of flat, contiguous transverse ribbons which collectively cover and protect the earth and seedlings, but which both admit rain water to critical areas and afford an easy egress to the open air by the germinating plants and also ingress, if desired, of certain "rooting" plants. The sheet can be laid after seeding without regard to registration of the seeds longitudinally with any particular places in the sheet. Laterally, it is only necessary that the relatively wide band defined by the slit pattern overlie the seed row. The ribbons in their quiescent state afford an effective evaporation and erosion barrier but can be made to allow for limited air venting to safeguard against overheating. Rain above the sheet can drain down to the soil in controlled amounts in a band concentrated precisely along the seed line, with the quantities being limited so that leaching of fertilizer into the water table or streams is prevented. The slit patterns can take a variety of forms with the transverse ribbons being either straight or non-linear such, for example, as saw-tooth. For use over broader areas than the relatively narrow growing rows, the slit pattern can be staggered and spaced to establish ribbons of continuous sheet material running longitudinally, laterally and diagonally, or various combinations thereof, so that the sheet will not fall apart or distort when handled.

Agricultural chemicals, such as herbicides and pesticides, can if desired be applied to the surface of the plastic in a water-soluble layer in amounts precisely matching the chemical concentration desired on the soil. The chemicals can be applied, for example, in liquid form to a continuous plastic sheet in a slurry, using a water or other liquid carrier, together with a suitable wetting agent, such as detergent, to assist in a uniform deposition, and a suitable binder or sticker, such as a milk solid derivative or synthetic compound, for holding the chemical deposition on the sheet. The carrier liquid is then evaporated off and the sheet rolled upon itself to form a sealed package.

With the passage of a number of weather cycles involving temperature changes, moisture will rise from the soil as vapor, condense on the underside of the sheet, dissolve the chemical deposition, and fall back to the earth. The sheet material thereafter functions as a mulch which serves the additional purpose of protecting the deposit of chemicals on the soil against loss due to erosion, leaching or wind, thereby enabling the use of reduced amounts of chemicals at the outset in combination with the chemicals or alone. Also, a layer of environmentally degradable material can be utilized, particularly in cold climates or for early planting, to hold the slits sealed closed for a predetermined period to promote maximum ground heating until germination, at which time the slits become freed to allow the plants to pass through.

In accordance with the present invention, highly active or non-selective herbicides can be applied to the sheet on either side of the central band, and a selective herbicide can be applied to the central area. The soil chemicals can be supported in carrier sheets of absorptive material which are then laminated to the sheet mulch, or they can be applied directly to the underside of the sheet. Various laminations can also be used, such as highly degradable black paper, in the strips beside the growing row both to carry chemicals and to block light. Also, various reflecting or partially reflecting or filtering layers can be used in selected areas.

DESCRIPTION OF THE PREFERRED EMBODIMENT

Figure 1A:
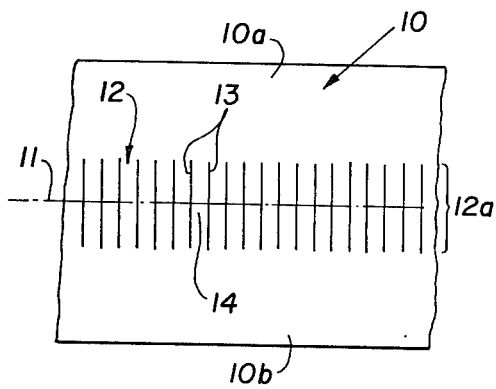
FIGS. 1A and 1B are top views of portions of agricultural mulch, the latter in position over a growing row.
Figure 1B:
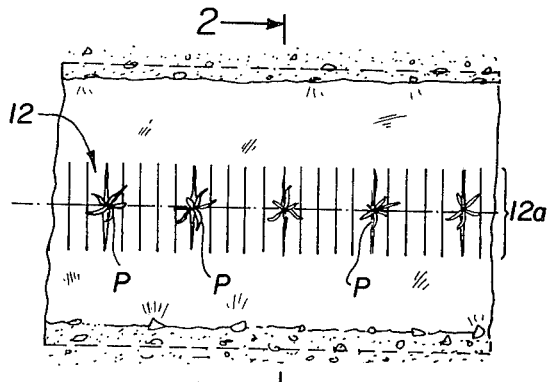

Referring to the drawings, and FIG. 1A in particular, there is illustrated an agricultural mulch sheet 10 in strip form. Side portions 10a and 10b extend the coverage to lines which are somewhat less than halfway to the adjacent growing rows. The mulch sheet 10 is preferably formed of an imperforate material, such as aluminum foil or plastic. The latter can take the form, for example, of a polyethylene sheet material of 1½ mils thickness, transparent or opaque, reflecting or nonreflecting, or a combination thereof, all as described more fully below. As best seen in FIGS. 1B and 2A and 2B, the sheet 10 is shown centered on the ground over a growing row 11 with the side edges anchored in the earth to secure the sheet in position. Placement of the sheet can be done manually or automatically. The latter can, for example, be accomplished by a tractor drawing a pair of laterally spaced shallow-set trenching blades which scrape hollow trenches to receive the edges of the plastic sheet as it is unrolled from a reel, followed by a pair of wheels to press the sheet into the trenches and by a pair of spaced pusher blades which replace the earth in the trench over the plastic. Such apparatus and techniques are conventional in the art and, therefore, need not be illustrated or described more fully. If desired, seeding equipment can be mounted directly ahead of the film layer as part of the same tractor rig. In a typical 3-foot wide sheet mulch, approximately 9 inches can be buried at each edge and 18 inches of center left exposed.

A continuous, recurring slit pattern 12 defining a band width, indicated by the numeral 12a, is formed in the center of the sheet 10. The band width is such that it straddles the growing row 11 with margins of several inches on either side. In the embodiment illustrated in FIGS. 1A and 1B, the slit pattern is comprised of a series of substantially parallel and equally spaced slits 13, each having a length corresponding to the band width 12 and with each adjacent pair defining a transverse ribbon 14 which straddles the growing row. A ribbon width of about one inch or 25 mm., and length of about 5 inches or 125 mm. is preferred for crops such as corn, beans, peas and potatoes, but narrower or wider widths can be used consistent with the strength of the sheet material on one hand and the ability of the emerging plants to push their way through the sheet by ribbon displacement on the other. The transverse ribbons 14 connect to the side portions 10a and 10b to integrate the sheet laterally by affording tension or bridging members. When in place on the ground, the flat ribbons collectively form a mulching surface along the band width 12a overlying the growing row. The slits, however, afford water drainage openings through which rain or irrigation water falling on the top of the sheet can seep into the ground in concentrated amounts precisely along the growing row. They also afford controlled venting which prevents overheating which can occur particularly in the case of transparent sheets which can kill corn on certain hot sunny days.

Figure 2:
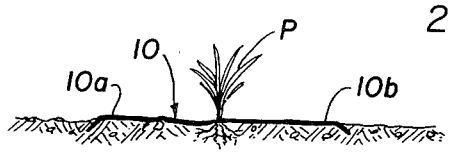
FIG. 2 is a view in transverse section taken on the line 2—2 of FIG. 1.

The transverse ribbons 14 are easily parted laterally so that it is possible to plant seeds through them in the event the mulch sheet is applied prior to seeding. It is preferred however, in most cases to place the mulch sheet after seeding. This can be accomplished, for example, by carrying the seeding or transplanting apparatus in the same tractor rig as the sheet-laying apparatus described above, causing the seeds to be planted in a row in advance of the sheet deposition, singly as for beans, corn and peas, or in clumps as for tomatoes. Registration of the growing roll 11 substantially along the center line of the sheet is readily accomplished within the latitude afforded by the band width 12a. There is no need, however, in accordance with the invention, to establish registration of each seed planted with any given position along the longitudinal axis of the sheet because the seeds can emerge at any point without damage of being blocked by the sheet. When the seeds emerge as small plants, the pliant ribbons part along the proximate slit to allow the plants P to grow as best seen in FIGS. 1B and 2. During the period prior to the emergence of the plants from the ground, the undisturbed ribbons define a substantially continuous mulch which protects the ground from the elements, thereby minimizing crusting and erosion of the earh prior to plant emergence. The impact of the rain and wind is borne primarily by the plastic. In the case of plants having low, spreading growth characteristics, a few of the ribbons can readily be severed on one side of the growing row after growth has begun to form enlarged openings to accommodate the plants. In the case of "rooting" plants, such as peanuts, the later developing roots can also find their way back down to the earth.

Figure 3:
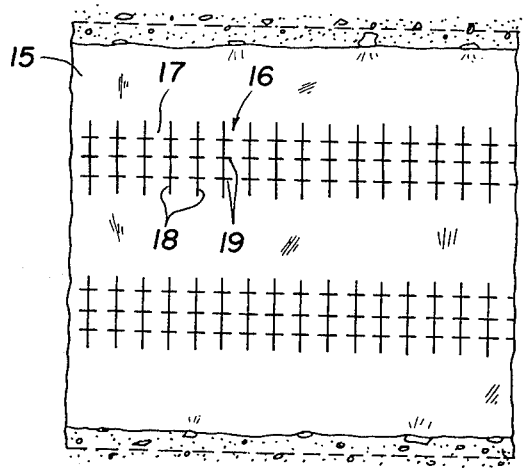
FIG. 3 is a top view of an agricultural mulch sheet having a modified slit pattern overlying two growing rows.

The sheet material can be made of a polyethylene plastic which degrades slowly in the presence of ultraviolet radiation from the sun or by exposure to soil chemicals, so that, at the end of the growing season, it will degrade into harmless bits. Alternatively, it can be formed of a less degradable material and taken up at the end of the growing season for re-use or re-cycling. While the suggested width of the ribbons 14 is about 1 inch and the suggested length about 5 inches, it will be understood that the widths and lengths can be varied as a function of the thickness and pliability of the plastic sheet, as well as the strength of the germinating plants, i.e. the ability of the plants to part the pliant ribbons as they emerge from the ground. It will be understood also that modifications in the slit pattern can be made for assisting plant penetration. Referring to FIG. 3, for example, there is illustrated a modification of the invention in which a plastic sheet 15 includes a slit pattern 16 defining transverse ribbons 17 of slightly greater width than the ribbons 14 of FIGS. 1 and 2. In this modification, each of the transverse slits 18 is crossed by one or more short longitudinal slits 19, each severing for a very short distance a portion of two contiguous ribbons 17. Thus, each ribbon includes one or more small rectangular flaps along its edge and overlying the growing row. The flaps can yield upwardly under the pressure of the plants and thereby ease the growing process as the plants emerge into the free air. This arrangement has the additional advantage of exposing less of the earth because less distortion of the main body of the ribbon occurs in many cases. The arrangement of FIG. 3 also includes two parallel slit-pattern bands, the sheet 15 being sufficiently wide to cover two parallel growing rows plus portions of the distances to the next growing rows. If desired, the longitudinal slits 19 on one side of the growing row can be extended to be very close together to form tear-out sections or bridges which part under plant pressure to form an enlarged opening to accommodate certain types of plant growth.

Figure 4A:
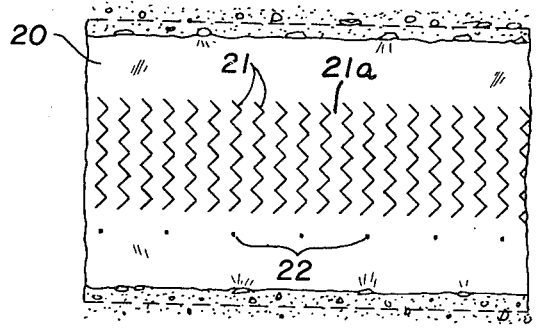
FIGS. 4A and 4B show other slit modifications.
Figure 4B:
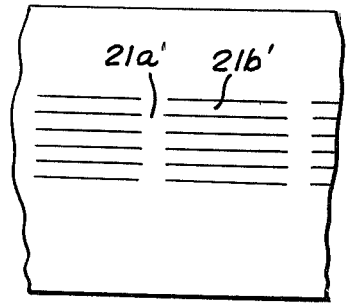

Referring to FIG. 4A, another modification of the slit pattern is disclosed. Formed in the sheet 20 is a central slit pattern formed by transverse undulating slits 21 spaced apart by the desired ribbon width and with the slits having their undulating pattern in phase. In this fashion, small arcuate flaps are defined at the edges of each of the transverse ribbons which assist the plant in penetrating the plastic sheet with minimum distortion of the complete ribbon. Each of the slits 21 thus defines laterally extending coplanar flaps on the basic continuous ribbons 21a. In FIG. 4B, the slits 21' are longitudinal and are arranged in stacks or clusters along the length of the sheet mulch. In this fashion, there are provided longitudinal continuous ribbons 21b in the slit pattern area in addition to the transverse continuous or bridging ribbons 21a'. The latter are, however, reduced in number and therefore afford somewhat reduced overalll lateral strength. For planting such crops as corn and beans in spaced "hills", the slit clusters can be correspondingly spaced. The non-linear slits of FIGS. 4A and 4B can have a geometry which is sinuous, sawtooth or modified saw-tooth such, for example, as having squared tips. Also, supplemental minor slit patterns can be superimposed on the basic pattern in the manner, for example, as shown in FIG. 3.

It will be understood, therefore, that a wide variety of slit patterns can be provided within the scope of the invention, using either linear or non-linear, transverse or longitudinal, or interrupted slits, or various combinations of different slit patterns. It is required basically that the pattern afford an integrated structure by providing continuous bridging ribbons with components along one or both axes of the sheet. Also, in accordance with the invention, one or both sides of the sheet can include an environmentally degradable coating such, for example, as a water-soluble or ultra-violet degradable material, which will keep the slits closed for a period of time before releasing the ribbons as the plants germinate in the presence of moisture and sunlight, as described below referring to FIG. 8A.

The mulch sheets can include a variety of other features depending on their intended use. For example, the upper surface of the sheets can include indicia 22 (FIG. 4) to serve as a guide for spacing seeds and useful in the case of hand-planting subsequent to laying of the sheets on the ground. Also, seeds can be attached to the sheets or the paper tape which is put down with the sheet.

In each of the embodiments of FIGS. 1 through 4B, the slit patterns, in addition to the other advantages noted, afford a means whereby the sheet mulch can be readily taken up after the growing season. In the case of conventional sheet mulches in which a single aperture is made corresponding to the placement of the seed beneath, the plant becomes an anchor for the plastic sheet which prevents it from being pulled away at the end of the growing season. A field of cornstalks, for example, makes it difficult to remove the plastic, and additional expense and effort are involved in removing the cornstalks before attempting to roll up or bunch up the plastic sheeting for disposal. Plant stalks which become part of the waste plastic bundle cannot be utilized as fodder or as organic matter to be tilled into the soil.

In accordance with the present invention, because of the continuous slit pattern defining transverse ribbons, it is a relatively simple matter when it is desired to remove the sheeting from the soil to slit the plastic sheet longitudinally to one side of the plant stalks but within the band width of the ribbons formed by the slit pattern. Knives, shears and hot wires are examples of severing means which can be used. The two sides of the plastic sheet can then be readily rolled up without being impeded by the plant stalks because the severed ribbons enable it to be easily freed from the stalks. It is possible, therefore, to remove the sheet plastic mulch at any time before or after maturity of the crop without damage to the plants.

In the arrangement of FIG. 4B, the longitudinal ribbons 21b' are pliant and thus yield to form openings to the sky under the pressure of the emergent plants regardless of where a plant might press across the entire width of a ribbon. The longitudinal ribbons 21b', however, serve the dual purpose of also strengthening the sheet against deformation under tension along the longitudinal axis of the sheet. The transverse ribbons 21a', not being defined by elongated side-by-side slits, are much less pliant for plant emergence but serve primarily to strengthen and stabilize the sheet against deformation under tension along the transverse axis of the sheet.

In the other embodiments of the invention as described below having reference to FIGS. 5A – 8, the majority of the ribbons running in various directions through the slit pattern are functionally more concerned with structural integrity of the slit sheet than pliancy for plant emergence, the latter function being taken over for the most part by flap configurations.

Figure 5A:
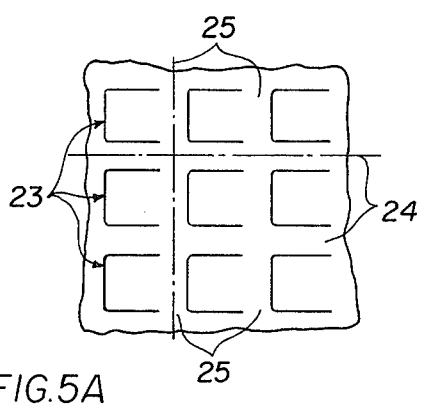
FIGS. 5A and 5B are fragmentary top views of other modifications of the slit pattern particularly useful for grass, cereal, forage and grain crops.
Figure 5B:
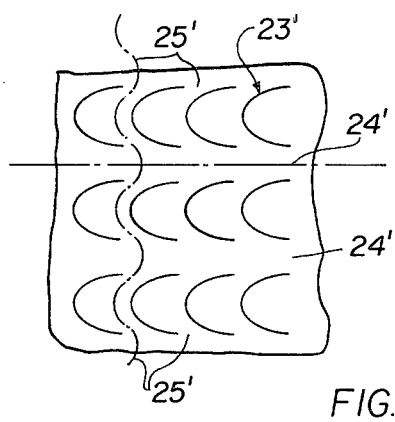

Referring to FIGS. 5A and 5B, the slit pattern takes the form of a myriad of uniformly spaced slits 23 which can be U-shaped or semi-circular, arranged in closely spaced relationship in longitudinal and transverse rows. The rows define continuous longitudinal ribbons 24 and transverse ribbons 25 which give longitudinal and transverse integrity and strength to the sheet, and the ribbons are sufficiently narrow as to be deformable by the growing plants. Each slit also forms a small flap which swings upward under the force of the emergent plant. By orienting the slit pattern on the growing field, it is possible to arrange the flaps so that they shield the majority of the emergent plants from the prevailing cold winds and cold sky radiation (the north sky in the northern hemisphere). On steep slopes, the flaps can be faced downhill to help control erosion and leaching of fertilizer. It will be understood that the slit pattern can be made throughout the entire surface of a plastic sheet because the continuous ribbons between slits form sheet-integrating bridges. Such overall pattern is particularly useful for growing grasses, grain crops, broadcast crops, radishes and turnips, which are sown uniformly over the ground as opposed, for example, to crops such as corn which are sown in discrete rows. The pattern can, however, be used in rows corresponding, for example, to those of FIGS. 1–4, although certain of the advantages of the uni-directional or one-axis bridging ribbons are not achieved.

Figure 7A:
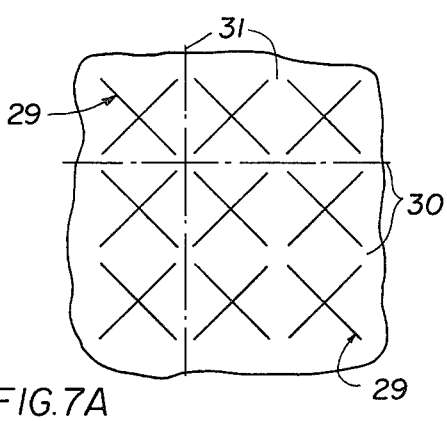
FIGS. 7A and 7B are fragmentary top views of other modifications of the slit pattern.
Figure 7B:
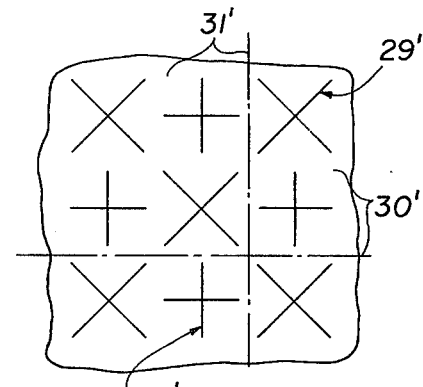
Figure 6:
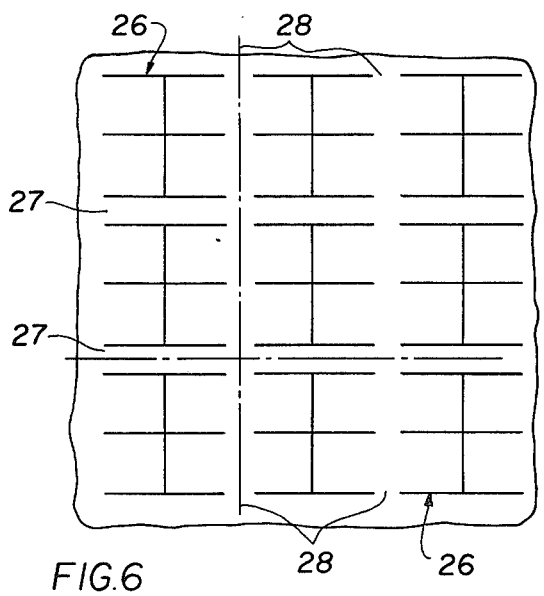
FIG. 6 is a fragmentary top view of another modification of the slit pattern related to that of FIG. 3.
Figure 8:
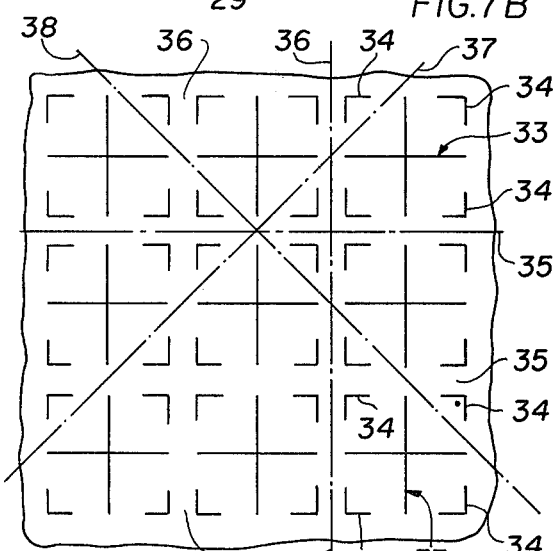
FIG. 8 is a fragmentary top view of still another modification of the slit pattern.

Referring to FIG. 5B, the slits are shown more closely spaced to cause nesting of the flaps and in which like parts are identified by like primed reference numerals. The transverse ribbons 27a', 27b', 27c', etc. thus become wavy or sinuous as opposed to straight, as in FIG. 5A. Under transverse tension, the sheet tends to deform causing the flaps to open. This effect can be utilized where greater early exposure of the soil is desired or where heating might occur under occasional unique weather conditions, such as a very hot, clear, sunny day. A tractor wheel run along the edge of the sheet, for example, can force the sheet into a shallow depression in the soil which stretches the sheet more tautly to pull open the flaps. Referring to FIG. 6, there is shown a more complex slit pattern 26 which reduces the number of longitudinal and transverse ribbons 27 and 28 respectively in relation to the flap size. The flaps are not oriented in one direction. The pattern of FIG. 7A is defined by an array of cross-slit configurations 29 in which the slits are on the two 45° diagonals and the crosses are spaced slightly apart to form longitudinal and transverse bridging ribbons 30 and 31 respectively. The pattern of FIG. 7B in which the 90° cross-patterns 29' are alternately turned 45°, yields slightly less accessing area for the emergent plants through the sheet, but it has the offsetting advantage of adding strength by avoiding direct alignment of adjacent slits, thereby lengthening the tearing path between slits. The pattern of FIG. 8 is formed by a more complex slit pattern in which each repeating slit configuration includes a central cross 33 with right-angle slits 34 in each of the four corners or quadrants, which affords eight hinged flap sections. The sheeet has structural integrity longitudinally by virtue of the longitudinal continuous ribbons 35; laterally, by virtue of the transverse ribbons 36; and along both 45° diagonals, by virtue of the diagonal ribbons 37 and 38. In this fashion, the sheet 41 has high stability against distortion, notwithstanding complete coverage of the sheet surface with slits. The patterns of FIGS. 5–8 are particularly adapted for use on large sheets for covering steep banks on which it is desired to establish an earth-holding crop of grasses. The sheet serves the multiple purposes of preventing erosion and preventing leaching of fertilizers while permitting the grasses to grow more or less uniformly and densely throughout the area. The sheets can be left in place until they completely deteriorate under the influence, for example, of sunlight.

Figure 8A:
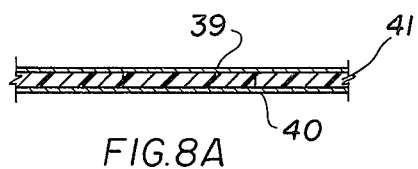
FIG. 8A is a view in transverse section in greatly enlarged scale of a portion of the sheet mulch of FIG. 8.

Also, if desired, the upper surface of the sheet can include animal repellents. The undersurface of the sheets can carry agricultural chemicals in water-soluble form. Herbicides, such as Atrazine for corn and Dymid for tomatoes, can be applied in the case of transparent sheets, and pesticides in the case of both transparent and opaque sheets. The chemicals can be applied, for example, in liquid slurry form to the sheets using a water or other liquid carrier, together with a suitable wetting agent, such as detergent, to assist in achieving a uniform deposition, together with a suitable binder or sticker, such as a milk solid derivative or synthetic material, for holding the deposition on the sheet. The chemical layer can also serve the purpose of forming an environmentally degradable coating over the sheet (in water or sunlight) which will hold the flaps or slits for a limited time after the sheet is placed on the ground until the coating dissolves or breaks down. As shown in FIG. 8A, coatings 39 and 40 on the two sides of the sheet 41 attract water particles in the form of condensate on the underside and on the upper side in the form of rain which slowly dissolves the layers both to free the flaps in the slit sheet and to allow the chemical to reach the earth.

In accordance with the invention, herbicides can be applied to the sheet in different forms and different concentrations. For example, in the case of the centrally slit embodiments of FIGS. 1–4B, lesser concentrations of selective herbicides can be applied to the central ribbon area and stronger non-selective herbicides can be applied to the side margins or shoulders.

While the invention has been described above having reference to preferred embodiments thereof, if will be understood that it can take other forms and arrangements within the scope of the invention. Referring to FIG. 1, for example, the sheet 10 can include opaque or partially opaque sides for weed control without herbicides, and a transparent center portion to admit sunlight to soil prior to germination. At a later date, the foliage of the crop will tend to preclude weed growth in that area. The opaque portions can be black or green, reflecting, partially reflecting or white (the latter three tending to maintain the coolest soil temperature and also to reflect sunlight upward against the underside of the leaves to enhance foliage growth and to discourage aphids). Laminations can be used for different characteristics in different areas of the sheet material. The ribbon slit pattern is particularly useful for covering crop plantings in small trenches, to define protective greenhouse spaces for early season planting. As the plants mature, they can either push their way through the slit ribbons or, if necessary, ribbons can be severed to form plant access openings or additional ventilation or both. This process can be effected manually or by farm machinery, the latter using a plant sensor such as a sensing finger which actuates a switch which in turn actuates a cutter such, for example, as a heated wire. The ribbon sequence pattern enables the grower to create openings of any desired size. In the early growing season prior to emergence through the sheet, the slits will admit water to the trench and prevent accumulations of mud on the sheet over the trench, thus continuing to admit needed sunlight. The invention should not, therefore, be regarded as limited except as defined in the following claims:

I claim:

1. A sheet mulch for agricultural plants comprising a strip of imperforate thin pliant sheet material to overlie at least one growing row and having margins on either side of the growing row, said sheet being formed with a continuous, recurring slit pattern in which the slits collectively penetrate the sheet at substantially equally spaced intervals along a band width within the margins and exceeding the width of the growing row, said slit pattern defining a sequence of substantially contiguous ribbons of sheet material joined to the margins and adapted to extend transversely across the growing row, thereby to join the margins in a laterally integrated assembly, the ribbon sequence defining a substantially continuous cover over the growing row, with the transverse ribbons being pliant to spread laterally to accommodate the stems of growing plants, whereby effective mulching occurs at substantially all points except those immediately surrounding emergent plant stems and whereby rain water can drain from the sheet into the ground in concentrations along the band width overlying the growing row.

2. The product of claim 1, at least a portion of said slits being non-linear.

3. The product as set forth in claim 1, said slit pattern comprising a sequence of substantially uniformly spaced parallel linear slits of substantially equal length extending transversely of the growing row.

4. The product as set forth in claim 1, said sheet mulch comprising opaque plastic.

5. The product as set forth in claim 1, said sheet mulch comprising transparent plastic.

6. The product of claim 1 including a deposition of a water-soluble agricultural chemical on the underside of the sheet.

7. The product as set forth in claim 5, including a deposition of a water-soluble agricultural herbicide on the underside of the sheet.

8. The product of claim 7 including a deposition of a first agricultural herbicide on the underside of the ribbon portions of the sheet, and a second agricultural herbicide on the side margins of the sheet.

9. A sheet mulch for agricultural plants comprising a normally imperforate pliable sheet material to overlie seeded ground, said sheet being formed with a recurring slit pattern extending along at least one axis of the sheet, said slit pattern defining a sequence of spaced-apart, narrow, unbroken pliant ribbons of sheet material, and a substantially continuous sequence of pliant flap portions between adjacent, spaced-apart ribbons, the slit pattern of the flat sheet forming a substantially continuous, aperture-free cover over the ground, said pliant ribbons and flap portions being adapted to yield upwardly and laterally under the pressure of emergent plants to define apertures facing both upwardly and laterally through which the plants reach the atmosphere above, whereby substantially all plants which germinate beneath the slit pattern can reach the atmosphere above the sheet without regard to any predetermined registration of the planted seeds relative to the slits.

10. The product according to claim 9, said pliant flap portions being arranged with their hinging axes in substantial parallelism to face in the same direction when pressed open by emergent plants.

11. The product according to claim 9, said pliant ribbons comprising at least two sets of ribbons intersecting at substantially right angles throughout the slit pattern.

12. The product according to claim 11, including a third and fourth set of pliant ribbons intersecting each other at substantially right angles throughout the slit pattern and disposed at substantially 45° angles to said two sets of intersecting pliant ribbons, whereby said sheet is laced with continuous ribbon bridges of sheet material extending longitudinally, transversely and diagonally.

13. The product as set forth in claim 12, each of said recurring slit patterns comprising a box configuration defined by relatively short right-angularly arranged slits at each of the four corners and a pair of crossed slits respectively bisecting the box transversely and longitudinally.

14. The product according to claim 9, at least a portion of the ribbons being sinuous to define flaps and also to distort under applied tension to the sheet in the direction of the ribbons to create controllable apertures in the sheet.

15. The product according to claim 9, including a coating of environmentally degradable material on at least one side of the sheet to hold the slits releaseably closed for a period substantially less than the crop growing period.

16. The product according to claim 11, said slit pattern covering substantially the entire sheet.

17. An article of manufacture comprising a thin mulching film of synthetic material for covering soil in which plants are to be grown and for enhancing the growth of such plants in the soil by increasing the temperature and keeping moisture retained therein, and having a plurality of parallel lines of spaced linear slits cut thereinto, and wherein the length of the linear slits is approximately 125 mm. and the spacing therebetween in each line is approximately 125 mm., and the spacing between lines is approximately 25 mm.

18. The mulching film for covering soil as set forth in claim 17, further comprising one surface of said mulching film being coated with a selected plant treating material, whereby said surface of said film may be placed adjacent the soil to be covered by the mulching film, and said film being substantially impervious to the passage of water therethrough so that water evaporated from said soil covered by said film condenses on said film surface and drops therefrom and thereby transfers said plant treating material from said film to the soil covered thereby.

* * * * *